Figure 1:
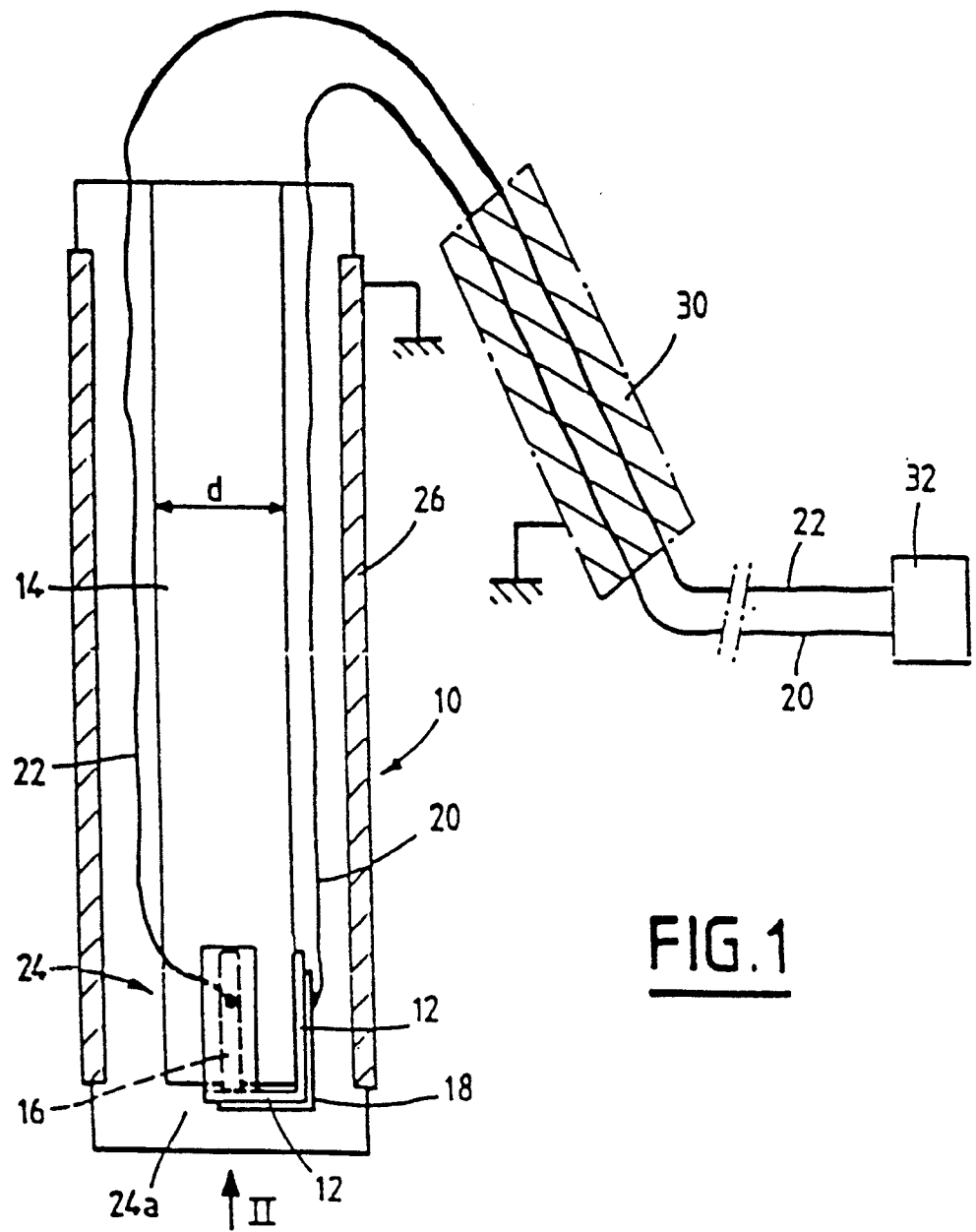

United States Patent [19]

Mestas et al.

[11] Patent Number: 5,293,353
[45] Date of Patent: Mar. 8, 1994

[54] METHOD FOR MANUFACTURING AN ACOUSTIC SENSOR, AND ACOUSTIC SENSOR OBTAINED THEREBY, HAVING A SUBSTANTIALLY NON-DETACHABLE PROTECTIVE LAYER

[75] Inventors: Jean-Louis Mestas, Chassieu; Dominique Cathignol, Genas, both of France

[73] Assignee: Technomed International, Paris, France

[21] Appl. No.: 787,322

[22] Filed: Oct. 22, 1991

[51] Int. Cl.⁵ .......................... H04R 17/00
[52] U.S. Cl. .................... 367/157; 367/165; 367/180; 367/140; 310/337; 310/800; 29/594
[58] Field of Search ........... 29/594, 609.1; 310/337, 310/800; 367/157, 159, 162, 164, 165, 169, 180, 140

[56] References Cited

U.S. PATENT DOCUMENTS

| H391 | 12/1987 | Henriquez et al. | 367/159 |
|---|---|---|---|
| 4,316,115 | 2/1982 | Wilson et al. | 310/327 |
| 4,488,873 | 12/1984 | Bloomfield et al. | 310/800 X |
| 4,577,132 | 3/1986 | Ohigashi et al. | 310/800 |
| 4,725,994 | 2/1988 | Kaneko et al. | 367/140 |
| 4,786,837 | 11/1988 | Kalnin et al. | 310/800 X |
| 4,789,971 | 12/1988 | Powers et al. | 367/157 X |
| 4,809,244 | 2/1989 | Penneck et al. | 367/159 X |

FOREIGN PATENT DOCUMENTS 0295907 12/1988 European Pat. Off. ..... H04R 17/00

OTHER PUBLICATIONS

K. F. Bainton et al.: "An Easily Constructed, Broad Bandwith Ultrasonic Probe For Research Purposes", Journal of Physics E. Scientific Instruments, vol. 14, No. 11, Nov. 1981, The Institute of Physics (Dorking, GB), pp. 1313-1319.

Primary Examiner—J. Woodrow Eldred
Attorney, Agent, or Firm—Cohen, Pontani, Lieberman, Pavane

[57] ABSTRACT

The invention relates to a method for manufacturing an acoustic sensor, and also to the sensor. The sensor comprises a piezoelectric sheet (12) mounted on a support (14) and electrically connected to electrodes (16,18) connected by electrical conductors (20,22) to a measurement device, characterized in that the assembly constituted by the sheet (12) and its support (14) is coated with a one-piece polymerizable coating layer (24) which is preferably electrically insulating, such that the portion (24a) of the coating layer (24) overlying the sheet (12) constitutes a protective layer which is rendered non-detachable or essentially non-detachable from the piezoelectric sheet (12). The method for manufacturing this sensor is extremely simple and inexpensive, and the protective layer is non-detachable.

20 Claims, 1 Drawing Sheet

METHOD FOR MANUFACTURING AN ACOUSTIC SENSOR, AND ACOUSTIC SENSOR OBTAINED THEREBY, HAVING A SUBSTANTIALLY NON-DETACHABLE PROTECTIVE LAYER

The present invention essentially relates to a method for manufacturing an acoustic sensor and to an acoustic sensor obtained thereby, having a substantially non-detachable protective layer.

Various acoustic sensors are already known for sound waves. For example, in the review Ultrasonics at pages 213 to 215, September 1981, P. A. Lewin describes a hydrophone for detecting ultrasonic waves. As ultrasonic waves detector elements, this hydrophone uses a sheet of piezoelectric polymer, preferably made of polyvinylidenefluoride (PVF2 or PVDF). However, this hydrophone is not usable for detecting shockwaves since shockwaves very quickly destroy the contact zones of the detector elements which are mounted directly on a support which is rigidly constructed.

One solution for solving this problem has already been attempted by S. W. Meeks as described in "Journal of the Acoustical Society of America" 1984, page 1010.

Another solution has also been proposed in U.S. Pat. No. 4,756,192. According to that solution, the detector comprises an internal conductor, a tubular external conductor serving as a housing coaxial with the internal conductor, and is characterized in that it includes a rectangular piezoelectric sheet of PVDF, a relatively thick support of PVDF inserted inside the external tubular conductor, with hollows being provided in the external tubular close to the PVDF sheet in order to provide three-dimensional separation. At column 2 lines 16–27 it is specified, that by way of additional precaution, the sheet can be provided with an insulating layer; and at column 2 lines 57–60, it is specified that in order to avoid damage resulting from cavitation processes, the detector sheet can be protected by means of a thin insulating layer such as aluminium oxide or silicon oxide whose thickness is preferably about 10 μm. This insulating layer can be made on one or both faces of the sheet.

However, the insulating layer which is formed only on the visible face of the sheet does not adhere securely to the sheet and will very rapidly become detached therefrom because of cavitation effects resulting from shockwaves. Further, no provision is made in that document for the insulating layer also to be disposed over the visible electrodes 4a. Given that the detector means must be immersed in water which is the fluid serving to propagate the shockwaves, this device does not provide genuine electrical insulation from the wave propagation medium.

Yet another solution is known from Document EP-A-0 256 438 which implements a thin metal sheet 17 that deforms under the effect of pulses 23 caused by the shockwaves. According to that solution, the deformation 29 of the metal sheet 17 caused by the shockwaves is detected optically. It therefore relates to a method of measurement which is totally different.

The object of the present invention is to solve the new technical problem consisting in providing a solution for a shockwave detector using a piezoelectric detector sheet, e.g. of the PVDF type, which is electrically insulated from the sound wave propagation medium, and in particular the shockwave propagation medium, by an electrically insulating protective layer which is hardly detachable or virtually non-detachable from the piezoelectric sheet.

Another object of the present invention is to solve this new technical problem by providing a solution which is particularly simple, and which implements a method that is simple, cheap, and usable on an industrial scale.

Another object of the present invention is to solve these new technical problems by means of a solution which makes it possible to obtain high degree of reproducibility in the qualities and the capacities of the detectors.

For the first time, the present invention solves the above-specified problems simultaneously, and in a manner which is satisfactory and usable on an industrial scale.

Thus, in a first aspect, the present invention provides a method for manufacturing an acoustic sensor of sound waves, in particular shockwaves, propagating in a propagation medium surrounding the sensor, for measuring the mechanical pressure of said waves of the type consisting in using a sensitive element having a piezoelectric sheet, in particular a PVDF sheet, mounted on a support and electrically connected to electrodes connected by electrical conductors to a measurement device, characterized in that the assembly constituted by the piezoelectric sheet and its support is coated with a one-piece polymerizable coating layer which is electrically insulating, such that the portion of the coating overlying the piezoelectric sheet constitutes an electrically-insulating protective layer which is rendered non-detachable or essentially non-detachable from the piezoelectric sheet.

Advantageously, a piezoelectric sheet is used having a surface which is small relative to the areas involved during molding of the coating layer.

According to a particularly advantageous embodiment, the support used is substantially cylindrical in shape, with one end of the cylinder serving as a support face for the piezoelectric sheet, which sheet is large enough in size to overlap around the sides of cylinder.

According to another preferred characteristic, the diameter of the support cylinder of the piezo-electric sheet is smaller than the final diameter of the sensor so that by filling the space around the cylindrical support of the piezoelectric sheet and the space over the sheet, a one-piece protective layer is created for the sheet, which layer also serves to definitively fix the sheet on the support, in particular by virtue of its very large surface of contact with the support cylinder.

Suitable materials for making the electrically insulating polymerizable coating layer include, for example, polymerizable epoxy resins, in particular of the araldite type, or, for example, a product such as polychlorotrifluoroethylene whose impedance is substantially identical to that of PVDF.

The protective layer is preferably cast so as to have a profile which is substantially cylindrical.

According to yet another advantageous characteristic of the method of the invention, the assembly comprising the cylindrical support, the piezoelectric sheet, and the electrically insulating protective one-piece layer is disposed inside a sheath constituting electrical screening, preferably in the form of a hollow cylinder extending forwards from the sensor to substantially the same level as the piezoelectric sheet. The cylinder supporting the PVDF sheet is advantageously constituted by a solid bar likewise made in the same polymerizable material as the coating layer.

It will thus readily be understood that the invention provides highly effective fixing of the piezoelectric sheet on its support, and also of the electrically insulating protective layer. Indeed, the piezoelectric sheet is sealed in a macroscopically undeformable block, of electrically insulating material, thereby ensuring permanent contact between the piezoelectric sheet and the protective layer, and thus ensuring that sound waves, and in particular shockwaves are transmitted perfectly, unlike in the prior art where a space would occur between the piezoelectric sheet and the protective layer, and however small that space, it would interrupt the transmission of waves.

According to the invention, it is preferable for the polymerizable material of the coating layer to have an acoustic impedance close to that of the piezoelectric sheet, thereby avoiding sound waves being reflected at each interface.

The thickness of the protective layer should be sufficient to ensure effective electrical insulation and to provide protection against shocks while not being so thick as to deform wave fronts, it should retain a reasonable passband, and avoid excessive limitation of the sensitivity of the sensor, which is particularly advantageous when detecting pressure waves due to the mechanical shockwaves of mechanical shockwave generators, in particular those used for lithotrity.

According to a second aspect, the present invention provides an acoustic sensor for sensing sound waves, in particular shockwaves, propagating in a propagation medium surrounding the sensor, thereby enabling the pressure of said waves to be measured, sensor of the type comprising a sensitive element including a piezoelectric sheet, in particular a PVDF sheet, mounted on a support and electrically connected to electrodes connected by electrical conductors to a measurement device, characterized in that the assembly constituted by the piezoelectric sheet and its support is coated with a one-piece polymerized coating layer, which is electrically insulating, the portion of the coating layer overlying the piezoelectric sheet constitutes a protective layer which is non-detachable or essentially non-detachable from the piezoelectric sheet.

Other characteristics of this sensor appear clearly from the preceding description given with respect to the manufacturing method.

Other objects, characteristics, and advantages of the invention appear clearly in the light of the following explanatory description made with reference to the accompanying drawing showing a presently preferred embodiment of the invention, given purely by way of illustration and having no limiting effect whatsoever on the scope of the invention.

In the drawings

Figure 2:
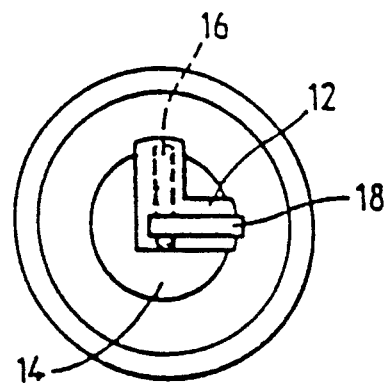

FIG. 1 is a longitudinal axial section view through the essential portion of an acoustic sensor according to the invention, in the presently preferred embodiment thereof; and FIG. 2 is an end view seen looking along arrow II of FIG. 1.

With reference to FIGS. 1 and 2, an acoustic sensor according to the invention is represented by the general reference numeral 10. Said acoustic sensor 10 includes a piezoelectric sheet 12, made of PVDF, for example. Preferably, this sheet of PVDF is entirely polarized. The thickness of the PVDF film determines the resonant frequency of the sensor. For example, if the film used has a thickness of 25 $\mu$m, then the resonant frequency specific to the sensitive component is about 20 MHz to 25 MHz. The passband of the sensors which is fixed by being coated in the construction shown in FIGS. 1 and 2 is about 5 MHz to 10 MHz.

This piezoelectric sheet 12 is mounted on a support 14 and carries electrodes 16 and 18 connected by electrical conductors 20 and 22 to a measurement device 32, as is well known to the person skilled in the art of sensors. For the electrical connection, reference can be made for example, to the prior art documents mentioned in the introduction of the present description, and in particular to U.S. Pat. No. 4,756,192.

According to the invention, the acoustic sensor is characterized in that the support 14 and the piezoelectric sheet 12 constituting a sensitive element of the sensor are coated in a one-piece polymerized coating layer 24 which is preferably electrically insulating, such that the portion 24a of the coating layer 24 situated over the sheet 12 constitutes a protective layer which is made non-detachable or substantially non-detachable from the sheet 12.

In an advantageous embodiment of the sensor-forming device according to the invention, the support 14 is in the form of a solid rod-forming cylinder, as can clearly be seen from FIGS. 1 and 2. The cylinder is advantageously made of a material whose impedance is identical or close to the impedance of the piezoelectric sheet 12. Similarly, the impedance of the polymerizable material used for making the protective layer 24 is advantageously identical or close to the impedance of the piezoelectric sheet 12.

In an advantageous variant of embodiment, it will be understood that the polymerizable material used for making the protective layer 24 is identical to that used for making the support cylinder 14. As polymerizable material, it is possible, according to the invention, to use any polymerizable material which is electrically insulating in the polymerized state, and in particular epoxy resins, notably of the araldite type.

The thickness of the protective layer 24a situated over the piezoelectric sheet 12 must be sufficient to ensure effective electrical insulation and to provide protection against shock, while not being excessively thick in order to avoid deforming wave fronts, in order to retain a reasonable passband, and in order to avoid excessively limiting the sensitivity of the sensor. In practice, a thickness of about five tenths of a millimeter satisfies said two criteria and enables shockwaves having a pressure rise duration of about 100 ns to be detected, and this is perfectly adequate for characterizing shockwaves under industrial conditions, in particular those produced in lithotrity, and in particular in the context of electrohydraulic generators.

As will readily be understood from FIGS. 1 and 2, the electrically insulating protective layer 24 may itself be cylindrical in profile. In addition, according to an advantageous variant of embodiment of the invention, a sheath 26 may be provided with at least a portion of the support 14 and its protective layer 24 being disposed therein, said sheath 26 extending longitudinally substantially to the level of the piezoelectric sheet 12, as is clearly visible and shown in FIGS. 1 and 2. Said sheath 26 is preferably electrically conductive by being made of a metal such as stainless steel, which is advantageously earthed or grounded so as to provide metallic screening, thereby eliminating the electrical interference generated by the source of shockwaves. This is particularly important and advantageous for lithotrity apparatus when using low sensitivity sensors such as those using a PVDF type piezoelectric sheet. Further, an auxiliary screening 30 may also be provided for the electrical conductors outside the sensor.

Concerning the electrodes 16 and 18, these are disposed perpendicularly to each other on either side of the piezoelectric sheet 12, according to the invention so as to form an angle substantially equal to 90°. The electrodes may advantageously be constituted by metal strips which are a few micrometers thick, preferably made of gold, and deposited by a vacuum metallization method on the sheet of PVDF. These metal strips may advantageously meet substantially in the middle of the visible face being effectively used for detection purposes, as shown in FIG. 2, which face is substantially in the form of a disk whose diameter is defined by the diameter d of the cylinder 14.

It will be understood that it is very easy to manufacture a sensor in accordance with the invention since the support 14 may be molded from a polymerizable material. Preferably, a material having the same impedance as the piezoelectric sheet, or an impedance which is close thereto, is chosen. It is preferred to use a polymerizable material of the epoxy resin type, in particular of the araldite type, which material is well known to the person skilled in the art, or a polychlorotrifluoroethylene whose impedance is identical to that of PVDF. Thereafter, the piezoelectric sheet, made for example of PVDF, whose size is larger than the diameter d of the support 14 is placed on the support 14 which is cylindrical so as to project sideways therefrom. Said piezoelectric sheet 12 is previously provided with electrodes 16 and 18 disposed on opposite sides of the sheet as described above, and in the manner known to the person skilled in the art of acoustic sensors. The electrodes 16 and 18 are also connected to the electrical conductors 20 and 22.

Thereafter, this assembly is placed in a mold, which is cylindrical in shape in this case, having a diameter close to the desired final diameter of the sensor. Into said mold is cast a polymerizable material, whose impedance is advantageously identical to or close to the impedance of the piezoelectric sheet 12 so that the assembly of the support 14 of the piezoelectric sheet 12 is coated with a polymerizable protective layer 24, constituting a single piece, which is preferably electrically insulating. Advantageously, the polymerizable material is an epoxy resin, and in particular of the araldite type.

It will thus be understood that a one-piece protective layer is thus obtained on the piezoelectric sheet 12 and that it is definitively fixed onto the support 14 by virtue of the very large area of contact with the support cylinder 14.

In addition, the sensor is electrically insulated from the water in which it is immersed. The advantage of this construction and its ease of manufacture are readily understood since the entire body of the sensor is made of a polymerizable material such as an epoxy resin, in particular of the araldite type.

Further, the sensor may be finished off by inserting it in an electrically conductive protective sheath 26 which is grounded or earthed, as shown.

Thus, the invention naturally includes any technical means constituting technical equivalents to the means described, as well as various combinations thereof.

It should also be observed that the length of the bar depends on the duration of the pressure signal to be observed. For example, if the speed of sound in the selected polymerizable resin is 2700 meters per second (m/s), then a wave striking the sensitive element 14 will disturb the measurement of the transmitted wave. A bar which is 30 mm long can be used for displaying a pressure signal for at least 20 microseconds, which constitutes sufficient duration for easy detection of sound waves.

What is claimed is:

1. A method of manufacturing a shockwave acoustic sensor for sensing shockwaves comprising the steps of:
   providing an elongated support member having a front end positionable in a direction facing the shockwaves to be sensed, a rear end opposite said front end and at least one lateral surface joining said front and rear ends;
   providing a piezoelectric sheet having a first surface provided with a first metal strip defining a first electrode having first and second portions, and a second opposite surface provided with a second metal strip having first and second portions defining a second electrode, said first portions of said first and second electrodes overlapping for defining an active sensing area;
   mounting said piezoelectric sheet on said support member with said overlapping first positions of said first and second electrodes on said front end of said support member and with the second portions of said first and second electrodes on said at least one lateral surface of said support member;
   connecting said second portions of said first and second electrodes with respective electrical conductors; and
   coating said piezoelectric sheet with a macroscopically undeformable protective coating layer on said front end of said support member and at least a part of said at least one lateral surface of said support member comprising said second portions of said electrodes, said protective coating layer being made of a single polymerizable material having a thickness effective for sealing the piezoelectric sheet in a macroscopically undeformable block of material when receiving shockwaves.

2. The method of claim 1, wherein said step of providing a piezoelectric sheet comprises the step of providing a polyvinylidene difluoride sheet.

3. The method of claim 1, wherein said step of providing a piezoelectric sheet comprises overlapping said first portion of said first electrode and said first portion of said second electrode at an angle for defining said active sensing area of said shockwave sensor.

4. The method of claim 1, wherein said step of mounting said piezoelectric sheet comprises the step of providing a support member comprising an elongated member having a circular cross section, said piezoelectric sheet extending beyond the edge of the front end of said elongated member, said protective coating layer comprising a one piece polymerizable material.

5. The method of claim 4, wherein said step of providing an elongated member comprises the step of providing an elongated member substantially cylindrical in shape and wherein said step of providing a piezoelectric sheet comprises said piezoelectric sheet including said electrodes extending onto said at least one lateral surface of said support member.

6. The method of claim 3, wherein said step of overlapping said first portions of said electrodes comprises overlapping said first portions at substantially a right angle.

7. The method of claim 1, wherein said step of providing a piezoelectric sheet comprises the step of providing said active sensing area substantially in the center of said front end of said support member.

8. The method of claim 1, wherein said step of coating said piezoelectric sheet material the step of coating said sheet with an electrically insulating polymerizable material.

9. A shockwave acoustic sensor for sensing shockwaves comprising:
 an elongated support member having a front end positionable in a direction facing the shockwaves to be sensed, a rear end opposite to said front end and at least one lateral surface joining said front and rear ends;
 a piezoelectric sheet having a first surface provided with a first metal strip defining a first electrode having first and second portions, and a second opposite surface provided with a second metal strip having first and second portions defining a second electrode, said first portions of said first and second electrodes overlapping for defining an active sensing area;
 a macroscopically undeformable protective coating layer for coating said piezoelectric sheet on said front end of said support member and at least a part of said at least one lateral surface of said support member comprising said second portions of said electrodes, said protective coating layer being made of a single polymerizable material having a thickness effective for sealing the piezoelectric sheet in a macroscopically undeformable block of material when receiving shockwaves.

10. The shockwave acoustic sensor of claim 9, wherein said piezoelectric sheet further comprises a polyvinylidene difluoride sheet.

11. The sensor of claim 9, wherein said first portion of said first electrode and said first portion of said second electrode overlap at an angle for defining said active sensing area of said shockwave sensor.

12. The sensor of claim 9, wherein said support member comprises an elongated member having a circular cross section, said piezoelectric sheet extending beyond the edge of the front end of said support member, said protective coating layer comprising a one piece polymerizable material.

13. The sensor of claim 12, wherein said support member is substantially cylindrical in shape and said piezoelectric sheet including said electrodes extends onto said at least one lateral surface of said support member.

14. The sensor of claim 11, wherein said angle comprises substantially a right angle.

15. The sensor of claim 9, wherein said active sensing area is substantially in the center of said front end of said support member.

16. The sensor of claim 9, wherein said polymerizable material comprises an electrically insulating material.

17. The sensor of claim 16, wherein said piezoelectric sheet has an impedance and said electrically insulating material has an impedance which is substantially identical to said impedance of the piezoelectric sheet.

18. The sensor of claim 9, wherein said support member comprises a polymerizable material identical to said polymerizable material substantially of said protective coating layer.

19. The sensor of claim 9, wherein said polymerizable material is a polymerizable epoxy resin selected from the group consisting of araldite and polychlorotrifluorethylene.

20. The sensor of claim 9, further comprising a grounded electrical screening sheath partially surrounding and connected to said protective coating layer.

* * * * *